United States Patent [19]

Ligman

[11] Patent Number: 4,658,197
[45] Date of Patent: Apr. 14, 1987

[54] MOTOR CONTROL CIRCUIT

[75] Inventor: James R. Ligman, Santa Barbara, Calif.

[73] Assignee: Casablanca Fan Company, Inc., City of Industry, Calif.

[21] Appl. No.: 178,796

[22] Filed: Aug. 18, 1980

[51] Int. Cl.$^4$ ............................................. H02P 5/40
[52] U.S. Cl. ................................. 318/812; 318/345 B
[58] Field of Search ............... 318/345 B, 345 F, 816, 318/817, 249, 812, 345 G, 779; 307/249, 250, 252 B

[56] References Cited

U.S. PATENT DOCUMENTS

| | | | |
|---|---|---|---|
| 2,981,879 | 4/1961 | Taylor et al. | 318/345 F |
| 3,324,372 | 6/1967 | Myers | 318/345 G |
| 3,378,748 | 4/1968 | Bull | 318/345 G |
| 3,389,315 | 6/1968 | Andreas et al. | 318/779 |
| 3,461,370 | 8/1969 | Canter | 318/812 |
| 3,487,345 | 12/1969 | Watrous et al. | 307/252 B |

FOREIGN PATENT DOCUMENTS 109122  8/1979  Japan ................................. 318/809

OTHER PUBLICATIONS

Kuelken, J. A., *Solid State Motor Controls*, Tab Books, 1978, pp. 151–152.
Kiver, M. S., *Transistor and Integrated Electronics*, McGraw-Hill, 1972, pp. 146–149.

*Primary Examiner*—David Smith, Jr.
*Attorney, Agent, or Firm*—Charles H. Schwartz; Ellsworth R. Roston

[57] ABSTRACT

A current control circuit for controlling the current supplied by an AC power source through an AC motor for providing a control of the speed of the motor, including, a semiconductor device having an input terminal, an output terminal and a control terminal and with the current passing from the input terminal to the output terminal forming a substantial portion of the current through the AC motor, and with a control signal provided at the control terminal and with an impedance provided in the output path of the semiconductor device and with the ratio between the amplitude of the control signal and the value of the impedance forming a substantial control of the value of the current passing from the input terminal to the output terminal, and with the ratio between the amplitude of the control signal and the value of the impedance controlled to predetermined values for controlling the current passing from the input terminal to the output terminal for controlling the speed of the motor.

14 Claims, 4 Drawing Figures

MOTOR CONTROL CIRCUIT

The present invention relates to a motor control circuit. Specifically, the present invention relates to a motor control circuit for use in controlling the speed of an AC motor such as a permanent split capacitance motor used as a fan motor such as for an overhead fan. However, it is to be appreciated that the motor control circuit of the present invention may be used to control AC motors used for other applications.

In the prior art there have been numerous devices used to provide for the control such as the control of the speed of an AC motor. For example, various types of transformers providing for a variable transformer ratio have been used to directly control the magnitude of the voltage applied to the AC motor. Other types of motor control circuits have used semiconductor switch devices which operate to switch off portions of the AC power during each cycle so as to effectively reduce the average voltage applied to the motor. Other types of prior art devices provide for control of the amplitude of a half cycle of the AC power so as to reduce the effective voltage applied to the motor. All of the prior art devices exhibit one or more of a number of deficiencies. For example, some of the prior art devices are bulky and expensive and would be difficult to incorporate within the motor housing for an AC motor. Other prior art devices do not provide for a smooth control of the speed of the motor and more importantly provide for an increase in the noise of the motor as the speed of the motor is controlled to different speeds.

The present invention overcomes a number of the deficiencies of the prior art in that the motor control circuit of the present invention is small and compact in size and is relatively simple in construction. In addition, the motor control circuit of the present invention provides for a smooth control of the speed of the motor and most importantly does not provide for an increase in the noise of operation of the motor at the various controlled speeds for the motor. The present invention provides for the speed control of the motor by controlling the magnitude of the current flow through the motor and operates on both half cycles of the AC power supplied to the motor.

In addition, the motor control circuit of the present invention not only provides for a current control but also provides for a limiting of the current supplied to the motor to a particular magnitude for any given control position of the motor control circuit. In particular, the present invention provides that the current be limited to predetermined maximum amplitudes even with changes in the load on the motor so as to ensure that the motor receives substantially uniform AC power for each particular control position. This provides for the smoothest possible operation of the motor to produce the minimum noise during the operation of the motor. If the motor control circuit of the present invention did not provide for the limitation of current, then variations in load would produce variations in the current supplied to the motor. This would provide for variations in the operation of the motor which would result in increases in output noise during the operation of the motor.

In a particular embodiment of the present invention, the motor load is placed in series with the motor control circuit across the source of AC power such as a standard 110 V AC line. A semiconductor device such as a transistor has a DC control voltage applied to the base of the transistor. The output path from the emitter includes an impedance which in combination with the control voltage limits the current flow through the transistor from the collector to the emitter. A plurality of diodes steer the current path through the transistor so that the motor control circuit operates on both half cycles of the AC power. The amplitude of the current is substantially controlled in accordance with the ratio between the voltage applied to the base of the transistor and the value of the impedance in the output path from the emitter of the transistor. Therefore, the amplitude of the current may be controlled by adjusting this ratio either by changing the voltage applied to the base or changing the value of the impedance in the emitter output path. The value of the impedance in the emitter output path is always maintained at a value greater than zero so there is a limitation on the amplitude of the current flow through the control device no matter what happens to the load on the motor. The limitation of the current flow tends to limit any undesired variations in the amplitude of the current flow thereby reducing significantly the noise produced by the motor.

A clearer understanding of the invention will be had with reference to the following descriptions and drawings wherein.

Figure 1:
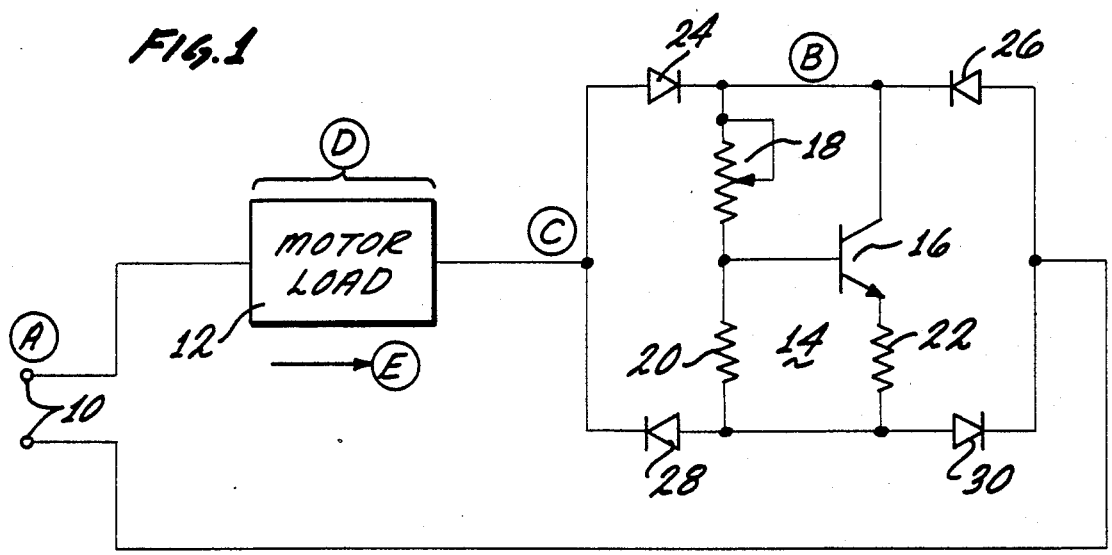
FIG. 1 illustrates a first embodiment of a motor control circuit constructed in accordance with the teachings of the present invention and controlling the current through a motor load.

In FIG. 1 a first embodiment of the motor control circuit of the present invention is shown and includes terminals 10 which receive a source of AC power such as a normal 110 volt AC line. A motor load 12 and a motor control circuit 14 are in series and are across the terminals 10. As indicated above, the load may be an AC motor such as a permanent split capacitance motor used for fans such as overhead fans.

The motor control circuit 14 includes an NPN transistor 16. A voltage divider circuit including a variable resistor 18 and a fixed resistor 20 is used to control the voltage applied to the base of the transistor 16. A resistor 22 is connected in the emitter output path for the transistor 16. A plurality of diodes 24 through 30 control the flow of AC current through the motor control circuit and provide for the motor control circuit operations on both half cycles of the AC power.

Figure 2:
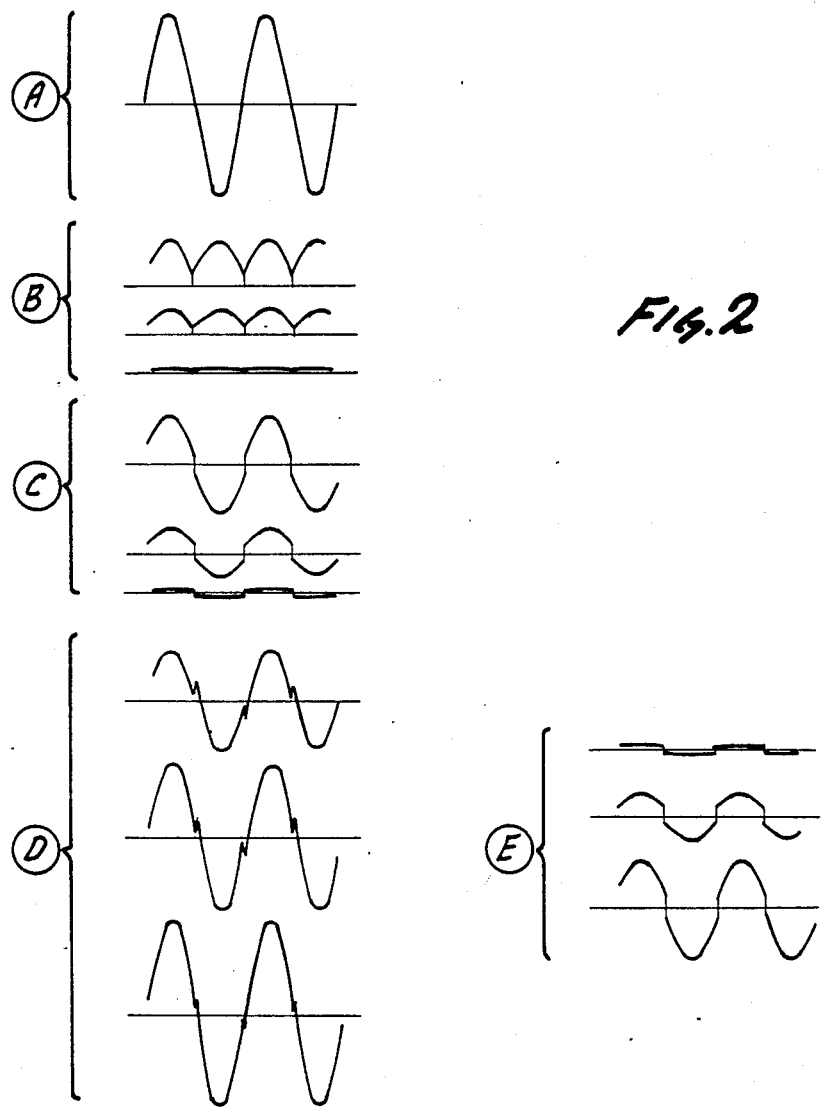
FIG. 2 is a series of wave forms corresponding to particular points in the circuit shown in FIG. 1.

FIG. 2 illustrates a series of wave forms designated A through E to correspond to points A through E shown in FIG. 1. Wave form A appears across the terminals 10 and, as shown in FIG. 2, is the standard 110 volt AC line. Each wave form B is the voltage which appears at the collector of the transistor 16 and is shown in FIG. 2 for a plurality of control positions for the control circuit. Each wave form B is shown to be a series of half cycle signals of a single polarity. The different amplitudes of each wave form B is in accordance with a particular control setting for the motor control circuit. In the embodiment of FIG. 1 the amplitude of each wave form B is controlled by setting the value of the variable resistor 18. Each wave form C is the voltage which appears across the motor control circuit 14 and as shown in FIG. 2 each wave form C is an AC signal having an amplitude in accordance with the setting of the value of the variable resistor 18.

Each wave form D is the voltage across the motor load 12 and each wave form E is the current through the motor load 12. As can be seen in FIG. 2 the voltage across the load 12 is an AC voltage having an amplitude in accordance with the value of the variable resistor 18. There is a slight discontinuity at the zero crossing of each wave form D because the motor load 12 acts as a large inductance. The current through the load 12, as shown by each wave form E, is an AC signal having variable amplitudes and the amplitude of the current is in accordance with the value of the impedance provided by the variable resistor 18. The amplitude of the current through the motor load 12 is limited so that the current cannot increase beyond a predetermined level even with variations in the load.

As can be seen from each wave form E, the speed of the motor 12 is adjusted in accordance with the amplitude of the current through the motor. In addition, the wave form of the current supplied to the motor 12 is symmetrical in nature and is limited in maximum amplitude for each speed control setting so that the motor does not receive undesired current variations which might create variations in operation of the motor which in turn would produce undesired noise.

In the particular operation of the motor control circuit 14, the diodes 24 through 30 control the direction of flow of the AC current so that there is a unidirectional flow of current through the transistor 16. This may be seen by each wave form D wherein the voltage for a complete cycle is of a single polarity. In particular, for one half cycle of the AC power shown in wave form A, the current flow through the transistor 16 is passed by the diodes 24 and 30 and blocked by the diodes 26 and 28. In the alternate half cycles, the current flow through the transistor 16 is passed by the diodes 26 and 28 and blocked by the diodes 24 and 30. The diodes 24 to 30 therefore form a full wave rectifier. The direction of the current through the motor control circuit is unidirectional while the AC power is the normal alternating signal.

In the operation of the motor control circuit 14 the current through the motor load 12 is essentially controlled by the ratio between the voltage on the base of the transistor 16 and the impedance in the emitter output path such as the resistor 22. This derives from the following. The current through the motor load 12 is substantially the same as the collector current for the transistor 16. This is because the current through the voltage divider formed by the resistors 18 and 20 and the base current are both significantly smaller than the collector current. Therefore these other currents may be substantially ignored. By the same token, the collector current would be equal to the voltage at the base of the transistor 16 minus the base to emitter voltage divided by the impedance in the emitter output path.

$$\left( Ic = \frac{Vb - Vbe}{R22} \right)$$

In the specific example shown in FIG. 1, the impedance is the resistance of the resistor 22. The voltage across the base emitter junction is substantially smaller than the voltage at the base of the transistor and can be ignored. Therefore, the collector current which is substantially the current through the motor load 12 is proportional to the voltage at the base of the transistor 16 divided by the resistance of the resistor 22.

As an example, if the maximum voltage at the base of the transistor 16 were two volts and the resistance of the resistor 22 was two ohms, this would provide for a load current having a maximum value limited to one amp. As can be seen in FIG. 2, each wave form E representing the current through the motor load 12 is substantially truncated due to this limiting effect. The advantage of this type of control circuit is that undesirable load variations do not produce equivalent changes in load current since the load current is limited. The load current through the motor 12 therefore has a smooth uniform cyclic pattern which tends to produce a smooth operation of the motor therefore substantially decreasing the noise produced by the motor.

As shown in FIG. 1, the amount of load current is controlled by adjusting the value of the variable resistor 18. This in turn controls the voltage applied to the base of the transistor 16 which produces the desired amplitude control of the current through the motor load 12 to in turn control the speed of the motor. Three particular amplitude levels are shown in the wave forms E in FIG. 2 ranging from a relatively high current which would produce a relatively fast speed for the motor down to a relatively low current which would produce a relatively low speed for the motor.

Figure 3:
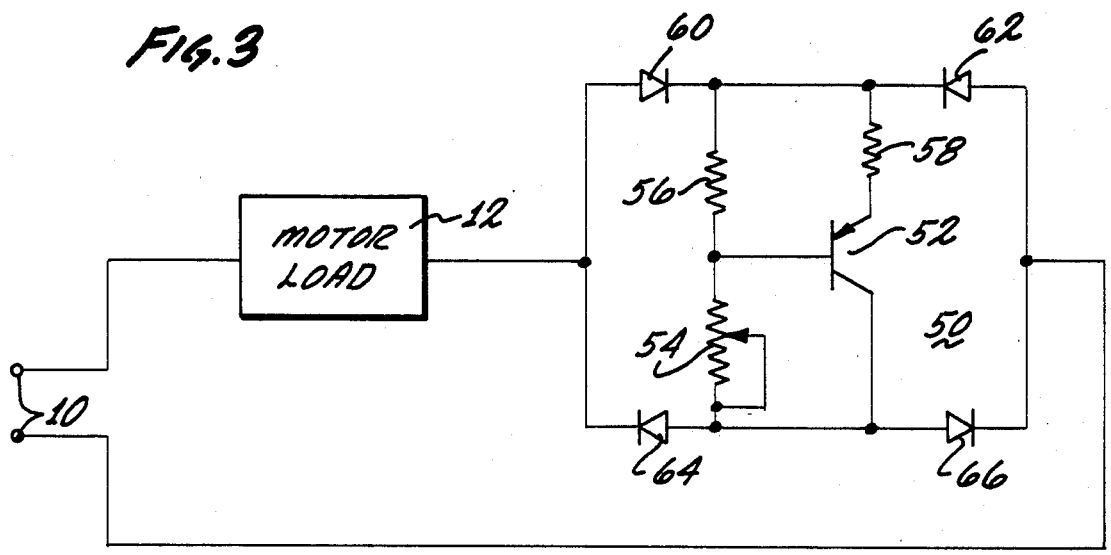
FIG. 3 is a second embodiment of a motor control circuit constructed in accordance with the teachings of the present invention.

It is to be appreciated that other motor control circuits constructed in accordance with the teachings of the present invention may be used. For example, FIG. 3 illustrates a motor control circuit 50 using a PNP transistor 52 to control the current through the motor load 12. The circuit of FIG. 3 is essentially similar to that shown in FIG. 1 except for the use of the PNP transistor 52 in place of the NPN transistor 16. FIG. 3 also includes a voltage divider formed by a variable resistor 54 and a resistor 56 to control the voltage at the base of the transistor 52. A resistor 58 is in the emitter output path of the transistor 52 and diodes 60 through 66 control the direction of current flow transistor 52. The operation of the circuit of FIG. 3 is substantially the same as that described above with reference to FIG. 1. It is also to be appreciated that the embodiments of the invention shown in FIGS. 1 and 3 may be combined so that the circuit would include both an NPN and PNP transistor and in this way the use of four diodes forming a full wave rectifier could be eliminated.

It is also to be appreciated that other arrangements of semiconductor devices and other types of semiconductor devices may be used with the present invention. For example, two transistors in a Darlington configuration may be used in place of the single transistors of FIGS. 1 and 3. Also, in place of the transistors, other semiconductor devices such as a FET semiconductor device may be used. With such a FET device, the drain, source and gate would be equivalent to the emitter, collector and base of the transistor.

Figure 4:
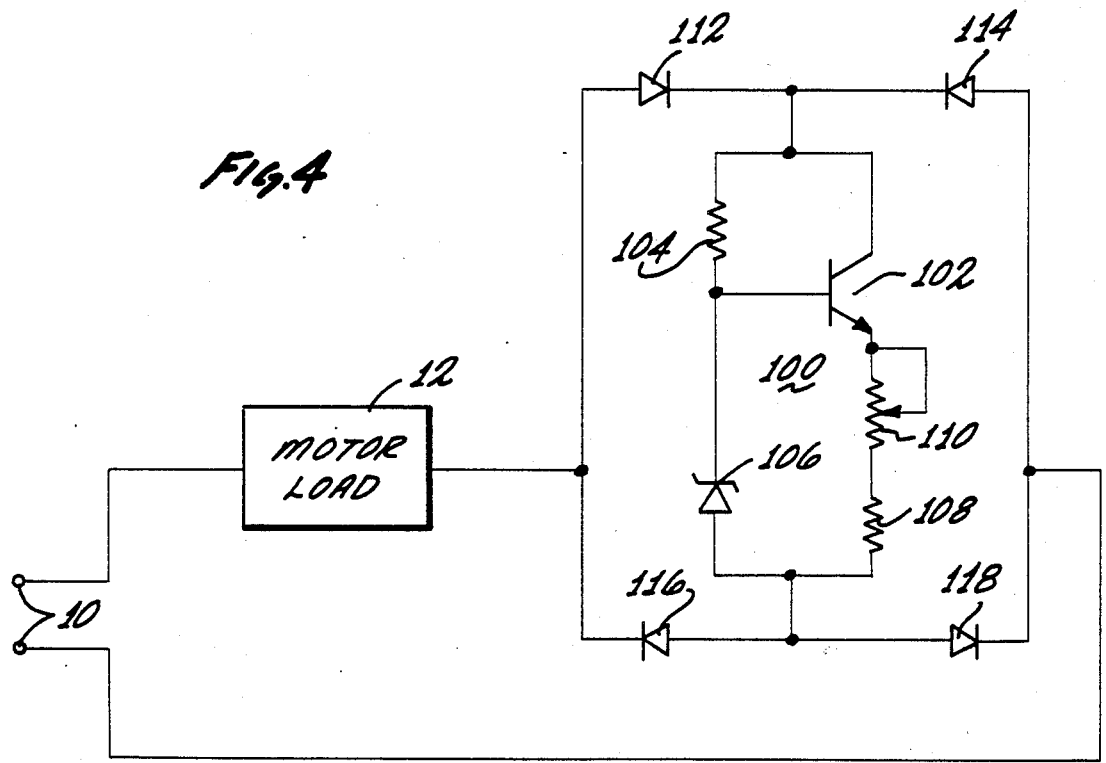
FIG. 4 is a third embodiment of a motor control circuit constructed in accordance with the teachings of the present invention.

FIG. 4 shows another embodiment of the present invention for controlling the current through the motor load 12 and in particular FIG. 4 includes a motor control circuit 100 including a transistor 102. In the embodiment of FIG. 4, the voltage of the base of the transistor 102 is provided by a voltage divider including a resistor 104 and a Zener diode 106. The Zener diode provides for a very accurate control of the voltage at the base of the transistor 102. It is to be appreciated that the voltage dividers shown in the embodiments of FIGS. 1 and 3 which are formed only of resistive elements also provide for an accurate control of the voltage at the base of the transistors but the use of the Zener diode in the embodiment of FIG. 4 insures that the voltage is limited to a predetermined amplitude depending upon the characteristics of the Zener diode 106.

In order to control the current through the motor load 12 the embodiment of FIG. 4 includes an impedance in the emitter output path for the transistor 102 consisting of a fixed resistor 108 and a variable resistor 110. The adjustment of the value of the resistance in the emitter output path provided by the variable resistor 110 controls the current through the motor load 12. As described above, the current through the motor load 12 is substantially in accordance with the ratio between the voltage at the base of the transistor and the value of the impedance in the emitter output path of the transistor. The use of the fixed resistor 106 insures that even if the variable resistor 110 is adjusted to its zero position, there is always some impedance in the emitter output path for the transistor 102. This insures that the current through the motor load 12 is limited to a maximum amplitude depending upon the value of the variable resistor so as to ensure that the motor load 12 will operate smoothly with a minimum noise at the different speed positions.

The embodiment of FIG. 4 also includes diodes 112 through 118 so as to control the direction of the current flow through the motor control circuit 100 in essentially one direction.

The present invention therefore provides for a motor control circuit which is simple in operation and construction and which provides for a current control of a motor load and with the control substantially in accordance with a ratio between the voltage applied to the control terminal of a semiconductor device and the impedance in the output path of the semiconductor device so as to produce a uniform alternating current through the motor load. The control current provides for maximum limited amplitude for the current through the motor load substantially in accordance with the voltage at the control terminal divided by the impedance in the output path. The present invention therefore provides for a smooth and accurate motor speed control and produces a minimum of noise output from the motor at the different speed control positions for the motor control.

Although the invention has been described with reference to particular embodiments, it is to be appreciated that various adaptations and modifications may be made and the invention is only to be limited by the appended claims.

I claim:

1. A current control circuit for controlling the full wave AC current supplied by an AC power source through an AC motor to predetermined substantially constant values and for additionally providing a control of the speed of the motor, including,
    a semiconductor device having an input terminal, an output terminal and a control terminal and with the current passing through the semiconductor device in a current path from the AC power source to the input terminal and from the output terminal to the AC power source forming a substantial portion of the current through the AC motor,
    first means coupled to the control terminal of the semiconductor device for providing a control signal at the control terminal,
    second means forming an impedance and connected in series within the current path through the semiconductor device from the output terminal to the AC power source for providing an impedance in the output current path of the semiconductor device to have the substantial portion of the current through the AC motor pass through the impedance and with the ratio between the amplitude of the control signal and the value of the impedance forming a substantial constant control of the value of the full wave AC wave AC current passing through the AC motor, and
    third means for controlling the ratio between the amplitude of the control signal and the value of the impedance to predetermined values for controlling the current passing through the semiconductor devices and the AC motor to predetermined substantially constant values for controlling the speed of the motor.

2. The current control circuit of claim 1 wherein the semiconductor device is an NPN transistor and with the input terminal, output terminal and control terminal comprising the collector, emitter and base of the transistor.

3. The current control circuit of claim 1 wherein the semiconductor device is a PNP transistor and with the input terminal, output terminal and control terminal comprising the collector, emitter and base of the transistor.

4. The current control circuit of claim 1 additionally including a plurality of unidirectional current devices coupled to the semiconductor device for controlling the current passing to the input terminal and from the output terminal to be in the same direction for positive and negative half cycles of the current supplied by the AC power source.

5. The current control circuit of claim 4 wherein the plurality of unidirectional current devices consists of four diodes formed in a full wave rectifier configuration.

6. The current control circuit of claim 1 wherein the first means is formed by a voltage divider circuit and the third means provides for varying the voltage output of the voltage divider circuit.

7. The current control circuit of claim 1 wherein the second means includes a resistor and the third means provides for controlling the value of the resistor.

8. A current control circuit for connection in series with an AC motor and with both across a source of AC power including
    a transistor having a base, collector and emitter and with the current through the transistor and within an output path from the emitter substantially forming the current through the AC motor,
    first means coupled to the base of the transistor for providing a bias voltage at the base of the transistor,
    second means forming an impedance and connected in series within the current path from the emitter for providing an impedance in the output path from the emitter of the transistor to have the current passing through the AC motor substantially passing through the impedance and with the ratio between the voltage at the base of the transistor and the value of the impedance in the output path from the emitter of the transistor substantially constantly controlling the value of the current through the AC motor, and third means for controlling the ratio between the voltage at the base of the transistor and the impedance in the output path from the emitter of the transistor to predetermined values for controlling the current through the transistor to predetermined substantially constant values for controlling the speed of the AC motor.

9. The current control circuit of claim 8 wherein the transistor is an NPN transistor.

10. The current control circuit of claim 8 wherein the transistor is a PNP transistor.

11. The current control circuit of claim 8 additionally including a plurality of unidirectional current devices coupled to the transistor for controlling the current through the transistor to be in the same direction for positive and negative half cycles of the current supplied by the source of AC power.

12. The current control circuit of claim 11 wherein the plurality of unidirectional current devices consists of four diodes formed in a full wave rectifier configuration.

13. The current control circuit of claim 8 wherein the first means is formed by a voltage divider circuit and the third means provides for varying the voltage output of the voltage divider circuit.

14. The current control circuit of claim 8 wherein the second means includes a resistor and the third mean provides for controlling the value of the resistor.

* * * * *